United States Patent [19]

Milner

[11] 3,829,547

[45] Aug. 13, 1974

[54] METHOD FOR POLYMERIZING PLASTIC

[75] Inventor: Sanford N. Milner, Riverview, Ala.

[73] Assignee: Milner Corporation, Opelika, Ala.

[22] Filed: Oct. 12, 1972

[21] Appl. No.: 296,885

Related U.S. Application Data

[63] Continuation of Ser. No. 825,740, May 19, 1969, abandoned.

[52] U.S. Cl.................. 264/297, 165/2, 264/325
[51] Int. Cl............................................. B29c 11/00
[58] Field of Search......... 264/297, 330, 325; 165/2

[56] References Cited
UNITED STATES PATENTS

| | | | |
|---|---|---|---|
| 1,935,794 | 11/1933 | Geyer | 264/297 |
| 3,309,186 | 3/1967 | Pietsch | 264/294 X |
| 3,422,168 | 1/1969 | Bowser | 264/297 X |

Primary Examiner—Robert F. White
Assistant Examiner—Richard R. Kucia
Attorney, Agent, or Firm—Newton, Hopkins & Ormsby

[57] ABSTRACT

A method for the polymerization of plastic including conveying means, heating means, cooling means, and control means for controlling the conveying, heating and cooling means. The control means causes the conveying means to move the raw unpolymerized plastic in a mold into the heating means, hold the plastic and mold in the heating means for a predetermined period of time to heat the plastic to polymerization temperature, to transfer the heated plastic and mold to the cooling means, and hold the heated plastic and mold in the cooling means for a predetermined time to cool the plastic and mold. The cooling means creates a fog spray cooling mist therein as well as a direct spray to cool the plastic and mold.

11 Claims, 12 Drawing Figures

METHOD FOR POLYMERIZING PLASTIC

This is a continuation, of application Ser. No. 825,740, filed May 19, 1969 and now abandoned.

BACKGROUND OF THE INVENTION

During the past few years a great deal of consideration has been given to the process of forming plastic parts by using a closed mold or cavity. This process consists of four individual steps — loading of raw material, molding or polymerizing, cooling or curing, and unloading of finished articles. Enthusiam for this process continues to run high, and continued growth for the process seems assured during the foreseeable future because of its strong points: ability to mold large or unusual configurations; and relative freedom of part design. Barring a few limitations, there is practically no shape or size that cannot be molded by this process. Generally speaking, the more complex the end product configuration, or the larger its size, the more suitable is this process for producing it.

In comparison with other plastic processing methods, machinery for closed mold polymerizing plastic is inexpensive relative to the size object which can be produced.

The machinery presently being used has not obtained the degree of sophistication enjoyed by some of the other plastic molding processes. In the past, the movement of the raw material through the molding step, to the cooling step and through the cooling means has been in a stop-and-go stage of operation primarily via manual means. Greater automation has yet to be attained in producing a continuous system of closed mold plastic polymerization initiated by a "start" buttom followed by an entire, fully automatic cycle of operation.

OBJECTS OF THE INVENTION

It is therefore a primary object of this invention to provide a process system for the polymerization of plastic raw material which is fully automatic in its operation.

A further object of this invention is to provide plastic polymerizing process containing a heating station and a cooling station with automatic movement of material through the heating station and cooling station.

A still further object of this invention is to provide a plastic polymerizing process having three stages of cooling in the cooling process.

Still another object of this invention is to provide a plastic polymerizing process utilzing a continuous automatically controlled transfer means for effecting movement of material into, through, and out of a heating means; from the heating means to a cooling means; and into, through, and out of the cooling means.

An additional object of this invention is to provide a plastic polymerizing process having a transfer means yieldable in its operation.

A further object of this invention is to provide a plastic polymerizing process having a heating station, heating means, and cooling station cooling means with automatic control means for effecting operation of the heating and cooling means.

An additional object of this invention is to provide a process system for polymerizing plastic simple in construction and operation, economical to manufacture, and reliable in operation.

These together with other objects and advantages which will become apparent reside in the details of construction and operation as more fully hereinafter described and claimed, reference being made to the accompanying drawings illustrating one embodiment, wherein like reference numerals refer to like parts throughout, and in which:

These figures and the following detail description disclose specific embodiments of the invention, however, the inventive concept is not limited thereto since it may be embodied in other forms.

DESCRIPTION OF ILLUSTRATIVE EMBODIMENTS

Figure 1:
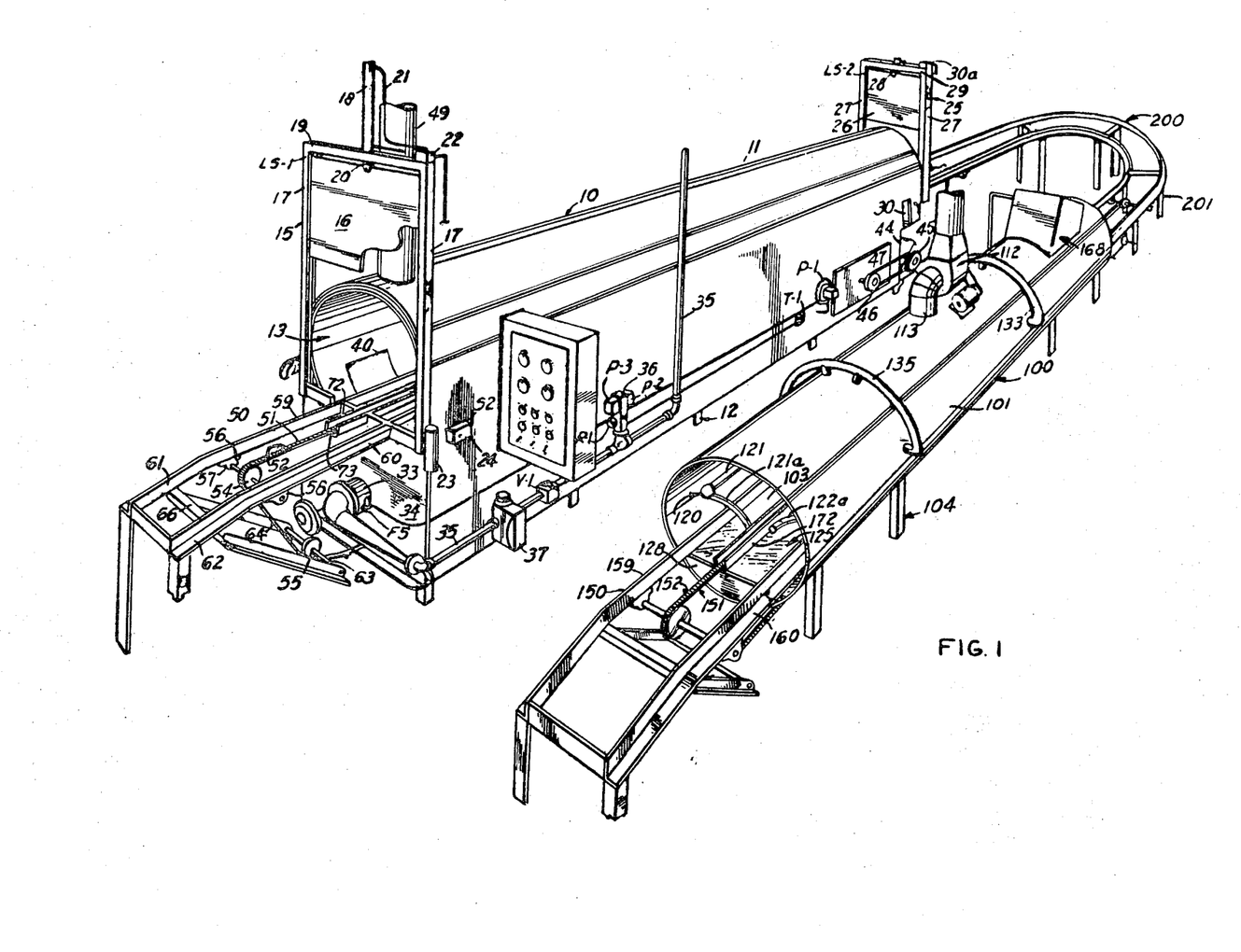
FIG. 1 is a right front perspective view of the process system including heating oven and cooling apparatus.

Referring now particularly to FIG. 1, of the drawings, the system will be described with reference to a heating oven 10 and a cooling apparatus 100, with intermediate transfer mechanism 200.

Heating Oven

Figure 2:
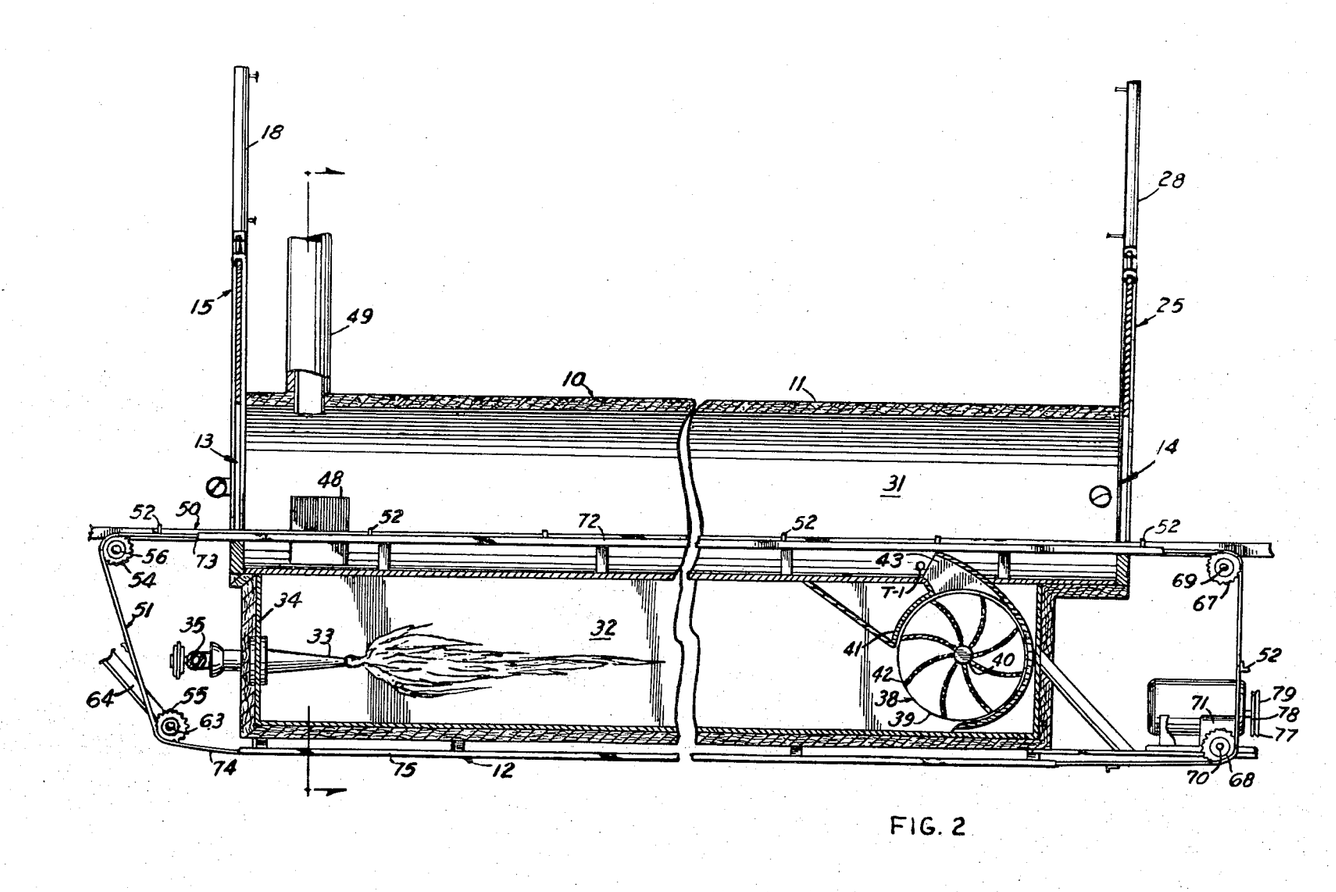
FIG. 2 is a vertical cross sectional view of the heating oven, with the view being taken substantially longitudinally through the center of the heating oven.

Referring now to FIGS. 1 and 2, the heating oven 10 includes an elongated cylindrical-shaped heating chamber 11 supported in a horizontal plane by support framework 12. Heating chamber 11 has an entrance opening 13 on one end and an exit opening 14 on an opposite end. Supported adjacent the entrance opening 13 is a closure means 15 consisting of a vertically moveable door 16. Door 16 is supported for vertical movement between an opened and closed position by a pair of vertically oriented channel shaped guide tracks 17. Movement of door 16 between an opened and closed position is effected by a phneumatic cylinder 18 supported on a cross member 19 mounted on the extended ends of guide tracks 17. Cylinder 18 includes a conventional piston (not shown) through control lines 21 and a conventional electromagnetic valve means 22. Mounted on a lower end of the door guide tracks 17 is a conventional photo electric cell 23 operatively associated with valve means 22 for effecting an operation of cylinder 18 to move door 16 to an open position should the photo electric cell 23 be operated. A manual switch control means 24 is supported on heating oven 10 adjacent the entrance opening 13. Switch control means 24 is operatively associated with electromagnetic valve means 22 for effecting an opening and closing of door 16 at any desired time.

Supported adjacent the exit opening 14 is a closure means 25 consisting of a vertically moveable door 26. Door 26 is supported for vertical movement between an opened and closed position by a pair of vertically oriented channel-shaped guide tracks 27. Movement of door 26 between an opened and closed position is effected by a phneumatic cylinder 28 supported on a cross member 29 mounted on the extended ends of guide tracks 27. Cylinder 28 is similar in construction to cylinder 18 and includes conventional control means similar to the control means of cylinder 18 including a photo electric cell control means 30 mounted adjacent exit opening 14 and electromagnetic valve 30a.

Referring now particularly to FIG. 2, the heating oven 10 includes an elongated heating chamber 31 and an elongated burner chamber 32. The air in burner chamber 32 is heated by a conventional gas fired burner nozzle 33 supported in one end wall 34 of burner chamber 32. Operation of burner nozzle 33 is effected by a conventional gas supply line 35 through conventional gas pressure control valve 36 and temperature control means 37 as seen in FIG. 1. Supported in the burner chamber 32 adjacent an end opposite burner nozzle 33 is a conventional squirrel cage blower means 38. Blower 38 includes a fan element 39 rotatably supported by shaft 40 within a blower housing 41 an entrance opening 42 communicating with burner chamber 32 and an exit opening 43 communicating with heating chamber 31. Operation of blower 38 will withdraw heated air from burner chamber 32 and then force the heated air along the length of heating chamber 31.

Operation of blower 38 is effected by a motor 44 supported adjacent heating chamber exit end (FIG. 1) which includes a drive pulley 45. Blower 38 includes a driven pulley 46 connected in driving relationship with motor drive pulley 45 by means of a belt 47. A series of openings 48 is provided between heating chamber 31 and burner chamber 32 adjacent the entrance opening or adjacent an end opposite blower means 38 for the purpose of allowing the air in heating chamber 32 to be recirculated through burner chamber 31 by the blower means 32. Supported directly above openings 48 is a burnt gas vent stack 49.

Figure 3:
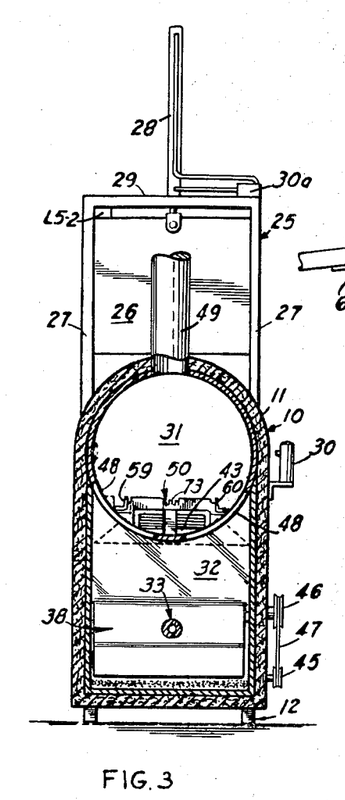
FIG. 3 is a vertical cross sectional view taken along lines 3—3 of FIG. 2.

Referring now to FIGS. 1–5, the heating oven 10 includes a mold transfer means consisting of an endless conveyor system 50 having an endless chain 51 supported for operation in a vertical plane and provided with a series of projecting lug elements 52. Endless chain conveyor 51 is supported adjacent the heating oven entrance end by a pair of vertically spaced and aligned sprockets 54, 55. Sprocket 54 is rotatably supported by a cross shaft 56 journaled in a pair of conventional bearing support elements 57, 58, mounted on the underside of a pair of transfer track elements 59, 60, respectively. As shown in FIGS. 1 and 3, the tracks 59, 60, are L-shaped and are supported within heating chamber 31 in a parallel coplanar relationship. The tracks 59, 60, adjacent the entrance end extend outwardly a distance sufficient to provide an entrance platform with the outer extended ends 61, 62, sloped downwardly slightly as shown in FIG. 1.

Figure 4:
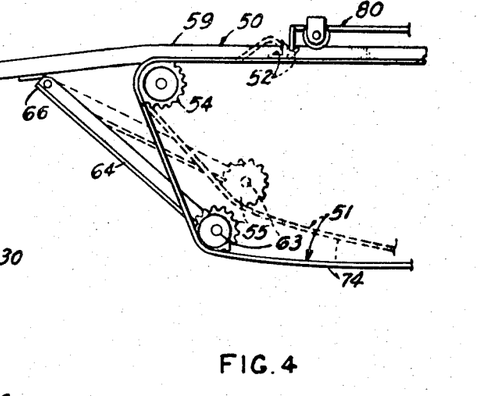
FIG. 4 is a fragmentary elevational view of one end of the conveyor, illustrating the yieldable support means.

Sprocket 55 is rotatably supported by a cross shaft 63 mounted on a pair of support elements 64, 65. Support elements 64, 65, are pivotally supported from the underside of tracks 59, 60, by a transverse hinge means 66 for movement between a lower conveyor holding position upwardly to a conveyor yielding position as shown in FIG. 4. The purpose of the conveyor yielding be described herein below.

The endless chain 51 is supported adjacent the heating oven exit end by a pair of vertically spaced and aligned sprockets 67, 68. Sprocket 67 is rotatably supported on a cross shaft 69 mounted on the underside of tracks 59, 60, by a pair of conventional support bearings (not shown) at a point outwardly displaced relative to the heating oven exit. Sprocket 68 is mounted on a shaft 70 journaled within a conventional gear reduction housing 71.

An upwardly directed channel-shaped guide track 72 is supported within heating chamber 31 in a horizontal relationship parallel and substantially coplanar with transfer tracks 59, 60. Guide tracks 72 support the upper run 73 of endless chain 51 for movement through heating chamber 31. The lower run 74 of endless chain 51 is supported by a downwardly directed channel-shaped guide track 75 mounted on the heating oven support framework 12 in parallel vertically spaced alignment with channel guide track 72.

Referring now to FIG. 2, the endless chain 51 is driven for transfer movement from left to right through the heating chamber 31 by sprocket 68. Sprocket 68 is driven by a motor 76 by means of gear reduction housing 71, driven pulley 77, belt 78, and motor drive pulley 79.

Figure 5:
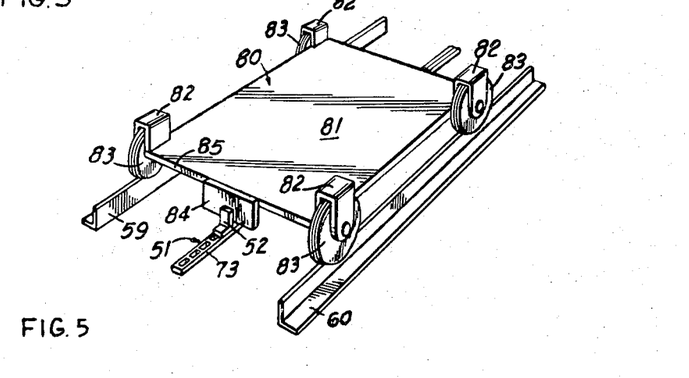
FIG. 5 is an enlarged fragmentary perspective view of the conveyor transfer means illustrating the transport dolly.

As shown in FIG. 5, a mold with material to be polymerized is transported through heating chamber 31 by means of a transport dolly 80 including a rectangular substantially flat horizontal supporting surface 81 provided with a wheel support bracket 82 adjacent each corner, each of which rotatably supports a pulley shaped wheel 83. The four wheels 83 consist of two laterally spaced pairs with the wheels of each pair being supported in for and aft coplanar relationship. The lateral spacing and pulley design of wheels 83 are detailed such that wheels 83 will operate in a tracked relationship on transfer support tracks 59, 60, through heating chamber 31.

Movement of transport dolly through heating chamber 31 is effected by lugs 52 carried by the upper run 73 of endless chain 51. As shown in FIG. 5, the lugs 52 will contact a bumper element 84 on the rear edge 85 of transport dolly 80 in a donwwardly extending relationship. Reference is now made to the yieldable support sprocket 55 described herein above, which is detailed in yieldable degrees to allow an endless chain lug element 52 to tilt to a position to allow lug 52 to pass under bumper 84 (as shown in FIG. 4) should the transport dolly become blocked while the endless chain 51 is in motion or the bumper 84 to pass over the lug 52 if the chain 51 is stopped when the dolly 80 is placed on the conveyor.

The automatic control means for controlling operation of the closure means 15, heating means 33, and transfer means 50 will be described herein below in the description of the operation of the polymerizing system.

Cooling Apparatus

Referring now to FIGS. 1 and 6–10, the cooling apparatus 100 includes an elongated cylindrical shaped cooling chamber 101 provided with an entrance opening 102 and an exit opening 103. Cooling chamber 101 is supported in a horizontal plane by support framework 104. Cooling chamber 101 consists of three cooling zones, 105, 106, and 107.

Cooling zone 105 is supported adjacent the chamber entrance and consists of a fogging zone having a fog generating means 108 mounted on the top of chamber 101. The fog generating means 108 includes a housing 109 communicating with the interior of cooling chamber 100 adjacent entrance opening 102. Mounted inside housing 109 is a conventional motor driven fogging impellar 110 and a water supply conduit 111. A fog exhaust system consisting of a conventional motor driven suction means 112 is mounted on top of cooling chamber 101 with an exhaust conduit 113 having one end 114 communicating with the interior of cooling chamber 101 at a point located between cooling zone 106 and cooling zone 107 and conduit opposite end 115 connunicating with the intake to exhaust system 112.

Figures 7, 8, 9:
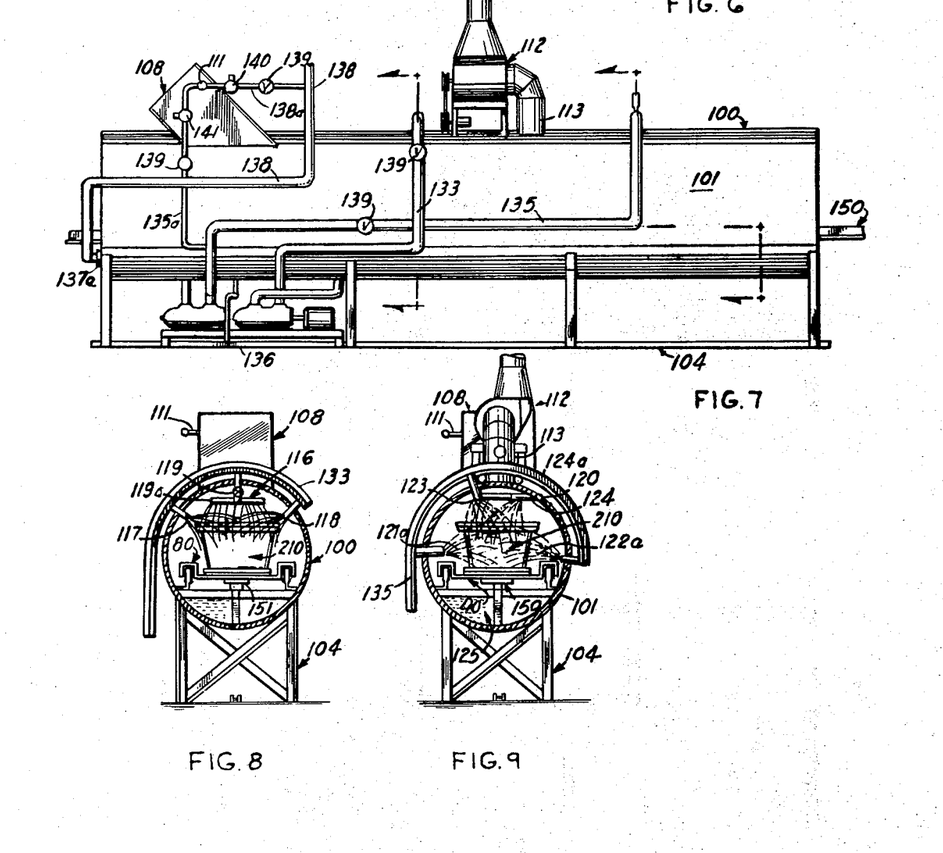
FIG. 7 is a left side elevational view of the cooling apparatus as shown in FIG. 1.
FIG. 8 is a cross sectional view taken along lines 8—8 of FIG. 7.
FIG. 9 is a cross sectional view taken along lines 9—9 of FIG. 7.
Figure 10:
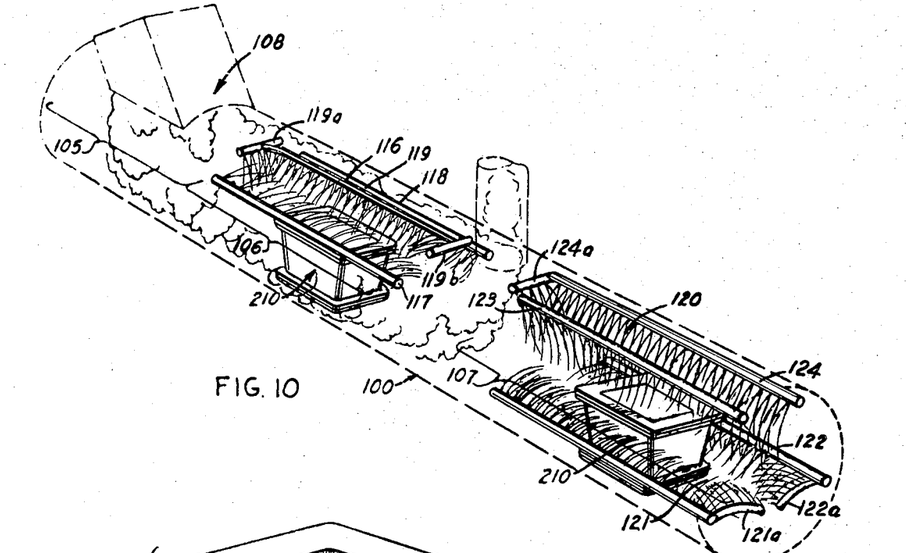
FIG. 10 is an enlarged left front perspective view of the cooling apparatus shown in FIG. 1 with certain parts being omitted for purposes of illustrating the relationship of the three cooling zones.

Cooling zone 106 is supported within chamber 101 intermediate cooling zones 105 and 107 and defines a primary water cooling area. Cooling zone 106 is best seen in FIGS. 8 and 10 and consists of a water spraying means 116 including a series of elongated longitudinally oriented spraying conduits 117, 118, and 119, each of which includes a series of spraying openings (not shown). The conduits 117-119 are detailed to spray streams of water substantially transversely of the cooling chamber 101 in a first direction of orientation, the purpose of which will be described herein below. Spraying conduit 119 includes transverse spraying portions 119a and 119b supported on opposite ends of conduit 119 and detailed to spray streams of water substantially longitudinally of cooling chamber 101.

Cooling zone 107 is supported within cooling chamber 101 adjacent exit opening 103 and defines a secondary water cooling area. Cooling zone 107 as best seen in FIGS. 9 and 10, consists of a water spraying means 120 including a series of elongated longitudinally oriented spraying conduits 121, 122, 123, and 124, each of which includes a series of spraying openings (not shown). The conduits 121-124 are detailed to spray streams of water substantially transversely of the cooling chamber 101 in a second direction of orientation, the purpose of which will be described herein below. Conduits 121, 122, and 124 are provided with transverse oriented portions 121a, 122a, and 124a detailed to spray streams of water substantially longitudinally of cooling chamber 101. Transverse portions 121a and 122a are flexible in construction, which will allow the material transport dolly 80 carrying a mold 210 to pass therethrough.

Figure 6:
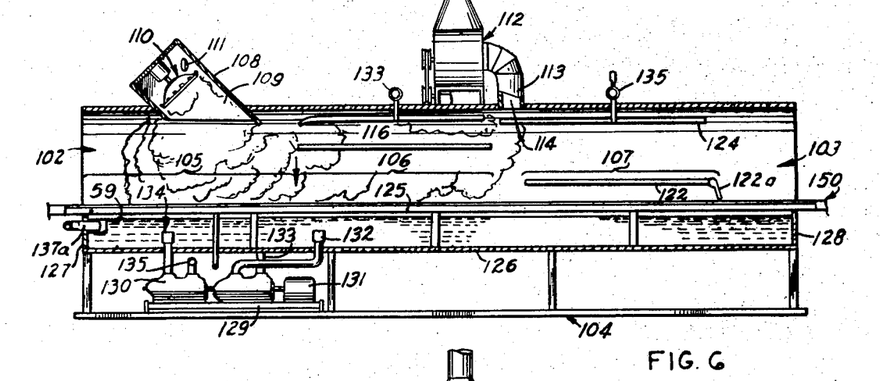
FIG. 6 is a vertical longitudinal sectional view taken through the center of the cooling apparatus, with certain parts omitted for purposes of clarity.

Referring now to FIG. 6, the cooling chamber 101 includes a water reservoir 125 formed by the bottom portion 126 of cooling chamber 101 and two end walls 127, 128. Water from reservoir 125 is supplied to the spraying means 116, 120 by a pair of pumps 129, 130, both of which are driven by a motor 131. Pump 129 includes an intake conduit 132 supported in flow communication with reservoir 125 and a supply conduit 133 connected to the water spraying conduits 117–119 of the primary water cooling zone. Pump 130 includes an intake conduit 134 supported in flow communication with reservoir 125 and a supply conduit 135 connected to the water spraying conduits 121–124 of the secondary water cooling zone.

Fresh water is supplied to the reservoir 125 from supply conduit 138 through pipe 137 and a float controlled valve 137a as seen in FIGS. 6 and 7. A stand pipe drain 136 is provided to prevent overflow of reservoir 125. Fresh water can also be supplied to conduit 111 in the fogging mechanism 108 through pipe 138a and solenoid valve 140. Water from reservoir 125 may also be supplied to the conduit 111 through pipe 135a connected to conduit 135 and through valve 141. In actual operation, water can be alternately supplied to conduit 111 from fresh water conduit 138 or recirculation conduit 135. Manually operated conventional flow control valves 139 are provided in conduits 135 and 133 as well as pipes 135a and 138a to control the flow of water therethrough.

Referring now to FIGS. 1, 6, 8, and 9, the cooling chamber 101 is provided with a material transfer means 150 including an endless chain conveyor 151, yieldable support means 152, dolly transport support tracks 159, 160, and chain channel support track 172, all of which are detailed in construction similar to the heating oven conveyor system 50. A detailed description of the cooling chamber transfer means 150 will be omitted and reference is made to the above description of the heating oven transfer means 50 for details of construction and operation.

Intermediate Transfer Means

Referring now again to FIG. 1, the polymerizing process system consists of the above described heating oven 10, and cooling apparatus 100, supported by support framework 12, 104, respectively, laterally spaced and substantially parallel to each other. The cooling apparatus transfer tracks 159, 160, are supported at an elevation slightly lower than heating oven support tracks 59, 60, with the exit end of heating oven transfer tracks 59, 60, being connected to the cooling apparatus transfer tracks 159, 160, adjacent the cooling chamber entrance end by means of a substantially U-shaped transfer track mechanism 200. U-shaped track mechanism is supported by a frame means 201. Track mechanism 200 is detailed in design to effect a transfer by gravity of a transport support dolly 80 from the heating oven exit opening to the cooling apparatus entrance opening.

Mold

Figure 11:
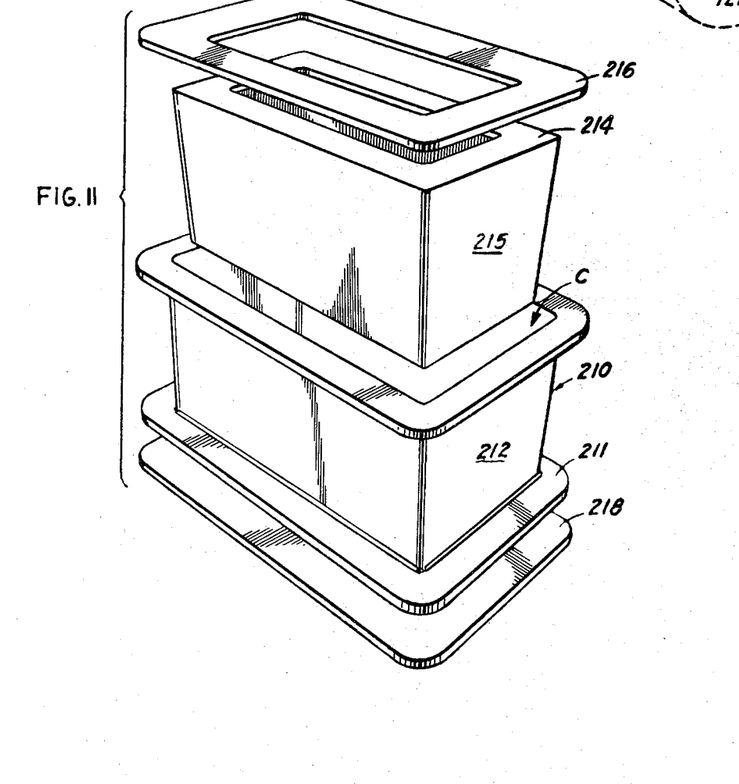
FIG. 11 is an exploded perspective view of a mold used with the invention.

Reference is now made to FIG. 11 for an illustration of one form of a closed mold 210 capable of use with the present polymerizing system. Mold 210 includes a substantially trapizoidal shaped container 211 defining exterior walls 212 and an interior opening portion 214 defining interior walls 215. Mold 210 is closed on top and bottom surfaces by a pair of plate members 216, 218, respectively. Defined between exterior walls 212, interior walls 215, and top and bottom plates 216, 218, is a mold cavity C provided with a predetermined shape for retaining an polymerizing plastic raw material into a desired shaped object. As shown in FIG. 11, the cooling apparatus above, provides the primary cooling area 106 wherein the water is sprayed in a first direction of orientation such that the sprayed water will contact the interior walls 215 of mold 210 to force heat out through the exterior walls 212. The spraying direction of orientation of secondary cooling area 107 is detailed such that the sprayed water will contact and cool the exterior walls 212 of mold 210.

OPERATION

Figure 12:
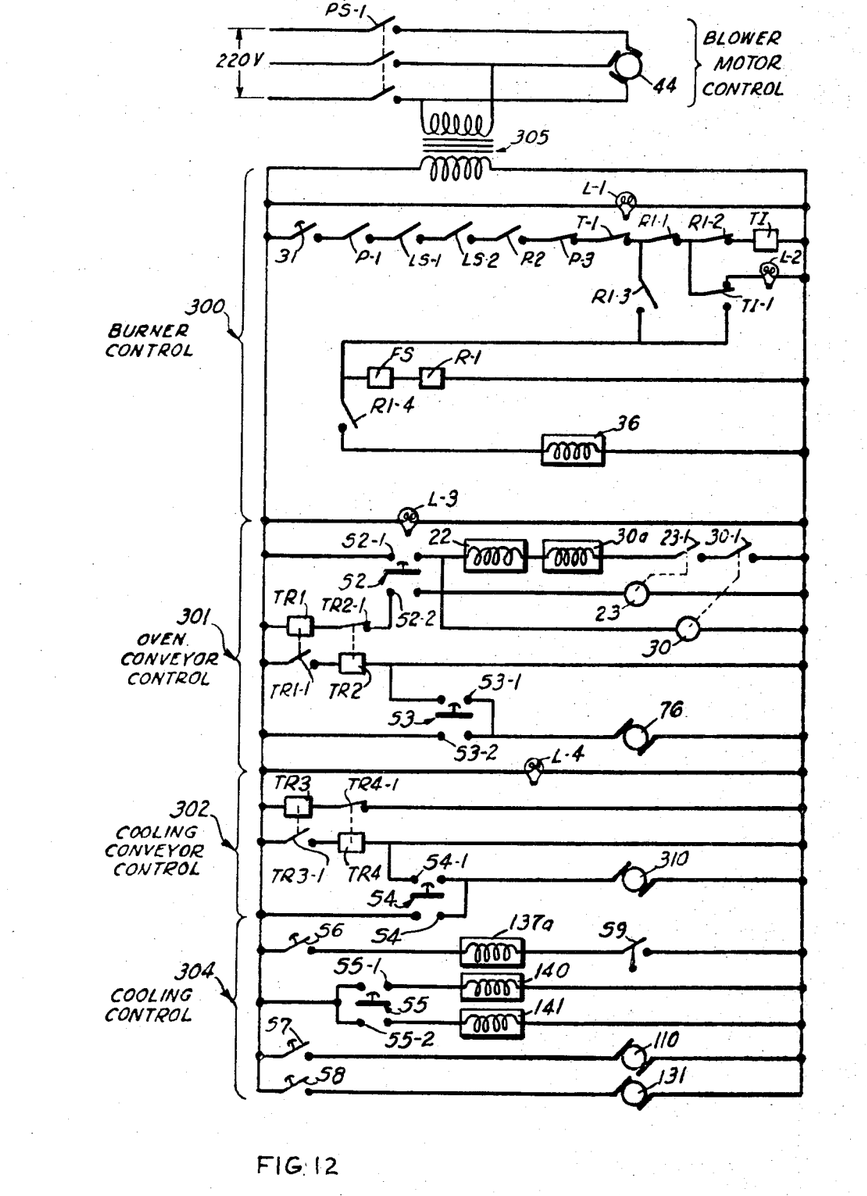
FIG. 12 is an electrical schematic diagram of the process system control mechanism.

To begin operation of the polymerizing system, the operator closes power switch PS-1 as seen in FIG. 12 to connect the motor 44 to a 220 volt power source. This would also connect the burner control circuit 300, the oven conveyor control circuit 301, the cooling conveyor control circuit 302, and the cooling control circuit 304 in parallel with each other to the 220 volt source through a conventional step down transformer 305. The blower 38 starts operating to purge the chambers 31 and 32 of explosive gases and lights L-1, L-3 and L-4 are illuminated to indicate that the various control circuits 300, 301, 302 and 304 are operational.

The operator then closes manual switch S-1 as seen in FIG. 11 to start the purging operation of burner control circuit 300. This connects a conventional timer mechanism TI to the power source through switches P-1, LS-1, LS-2, P-Z, P-3 and T-1 and contacts R1-1 and R1-2. Switch P-1 is a conventional pressure activated switch shown in FIGS. 1 and 2 at the exit end 43 of housing 41 and is closed when blower 38 is operating. Limit switch LS-1 is located on entrance closure means 15 and is closed when door 16 is in its raised or open position. Limit switch LS-Z is located on exit closure means 25 and is closed when door 26 is in its raised or open position. Switch P-Z is a conventional pressure actuated switch shown in FIG. 1 and is closed when the gas pressure in supply line 35 is above a certain predetermined value. Switch P-3 is also conventional pressure actuated switch shown in FIG. 1 and is opened when the gas pressure in supply line 35 rises above a predetermined value. Switch T-1 is a normally closed temperature actuated switch as seen in FIG. 1 and is opened when the temperature at blower 38 exceeds a certain value. Therefore, if the gas pressure in supply line 35 is within a certain range, the blower 38 is operating, the chamber 32 at blower 38 is not too hot, and the doors 16 and 26 are raised then the timer mechanism TI will be activated when switch S-1 is closed.

When timer mechanism TI is activated, it prevents the supply of gas to nozzle 33 for a predetermined period of time to allow the blower 38 to purge any explosive gases from chambers 31 and 32. After timer mechanism TI has completed its time delay cycle, contacts TI-1 are transferred to supply voltage to a conventional flame sensor switch FS. Switch FS determines if there is a flame at the pilot of burner nozzle 33. If the pilot is lit then switch FS is closed to activate coil RC1 of relay R1. This opens contacts R1-1 and R1-2 to deactivate timer mechanism TI and close latching contacts R1-3 to maintain relay R1 energized.

Activation of relay R1 also closes contacts R1-4 to activate gas pressure control value 36 which allows the manually operated main valve V-1 to be opened to start the main flame at the burner nozzle 33. Control valve 36 is a safety device which is connected to appropriate pressure and temperature switches so that if the gas pressure in gas supply line 35 raises above a certain value or drops below a certain value or if the temperature in chamber 32 drops below a certain value, then the gas supply is cut off to the burner nozzle 33 and cannot be reopened until the purging cycle has been completed. Temperature control means 37 is a thermostatic control which regulates the gas flow to burner nozzle 33 to maintain the preselected temperature in the chambers 31 and 32.

While the purging cycle is completing, the operator has started filling molds 210 with charges of unpolymerized plastic material such as a polycarbonate and starts placing the molds 210 on the conveyor 50 on dollies 80. As soon as the oven 10 is being heated, the operator moves 3-position switch S2 from its open position as seen in FIG. 12, in which the doors 16 and 26 are raised, to its automatic position closing contacts S2-2 to start operation of the oven conveyor 50. This connects timer relay TR1 and photo electric cells 23 and 30 to the power source through normally closed contacts TR2-1 of timer relay TR2 to energize timer relay TR1 and photoelectric cells 23 and 30. If a mold 210 is not blocking cells 23 or 30, then contacts 23-1 of photocell 23 and contacts 30-1 are closed to connect solenoid valves 22 and 30a to the power source to cause fluid to be supplied to cylinders 18 and 28 to lower or close doors 16 and 26.

After timer relay TR1 has completed its cycle, it closes latching contacts TR1-1 to activate timer relay TR2 and open contacts TR2-1 to de-energize relay TR1 and raise doors 16 and 26 by de-energizing solenoid valves 22 and 30a. If the 3-position manual switch S3 has been moved to its automatic position by the operator to close contacts S3-1, then motor 76 which drives oven conveyor 50 is activated to drive the convey chain 51 from the left to the right as seen in FIG. 2. Timer relay TR2 is held energized by latched contacts TR2-1 and is set on the appropriate time delay to move the mold 210 into the chamber 31 before it completes its cycle and re-closes contacts TR2-1 to energize relay TR1 and open or unlatch contacts TR1-1. This stops the conveyor 50 with the mold 210 in heating chamber 31.

This causes the doors 16 and 26 to again be closed and the relay TR1 is set for an appropriate delay cycle to allow the plastic within mold 210 to heat to polymerization temperature. The timing cycle of relay TR2 is then repeated to cause the heated mold 210 to be moved out of oven 10 and onto the intermediate transfer means 200. The time delay of the mold in the oven is variable so that the material being polymerized, the temperature in the oven, and the shape of the object being produced can be taken into consideration. Moreover, with proper controls on the motor 76 the heating cycle can be made continuous or the time delay cycle can be repeated several times before the mold 210 is moved out of the over 10.

The operater closes manual switch S6 to connect valve 137a to the power source through normally float switch S9 to cause fresh water to be supplied to reservoir 125 until switch S9 is opened by the water level. The operator then moves 3-position manual switch S5 to the fresh water position or recirculated water position to close contact S5-1 or S5-2 respectively. If contacts S5-1 are closed valve 140 is opened to admit fresh water into fog mechanism 108 and if contacts S5-2 are closed to open valve 141 and supply recirculated water from reservoir 125 to fog mechanism 108. Switch S7 is then manually closed to start the motor of the fogger unit 110 and switch S8 is closed to start the motor 131 and drive the pumps 129 and 130. The operation of the cooling means 100 is then ready for receipt of the mold 210.

The operator then moves 3-position manual switch S4 to its automatic position closing contacts S4-1 connecting motor 310 to the power source through timer relay TR4 and contacts TR3-1 of relay TR3. Timer relay TR3 is associated with relay TR4 and is connected to the power source through normally closed contacts TR4-1 of relay TR4. Timer relay TR3 corresponds to relay TR1 of the oven conveyor control circuit 301 and timer relay TR4 corresponds to timer relay TR2 of circuit 301. Therefore, it will be seen that conveyor 150 is stopped while relay TR3 is cycling and is started while relay TR4 is cycling. This is sufficient to first place mold 210 in zone 105 for a predetermined time, then in zone 106 for a predetermined time, and then in zone 107 for a predetermined time. On each cycle of the relays TR3 and TR4, the mold 210 is moved one zone. Moreover, it will be understood that the movement through the cooling means may be made continuous.

The conveyor 150 then discharges the mold 210 and its associated dolly from the cooling means 100 ready for the mold 210 to be removed from the polymerized plastic article formed therein. By first cooling the inside of the mold 210 and then the outside, the mold 210 will be cool enough on the outside thereof for the operator to remove the same when it comes out of the cooling means 100.

It will also be seen that the fog created by the fog mechanism 108 is present in cooling zone 105 and 106. This fog provides a very effective cooling medium for the mold 210 while in zones 105 and 106.

The above described cycle of operation has been described to include a stopping of a mold 210 in the heating oven for polymerizing and at each of the cooling zones 105, 106, 107 for cooling with an automatic continuation of mold 210 from each stopping stage after a predetermined length of time. However, it could be obvious that the length of heating oven 10 and the length of cooling zones 105, 106, 107 could be detailed in design such that a timed rate of continued movement could be effected by mold 210 through the entire system.

From the foregoing operation, it will be seen that the method of the invention includes the steps of:
a. confining unpolymerized plastic raw material in a predetermined shaped area;
b. moving the confined raw material through a polymerization zone to polymerize same;
c. transferring the polymerized material to cooling zone; and
d. moving the polymerized material through said cooling zone to cool same below polymerizing temperature. step (b) is performed by holding the confined raw material in a heated medium until it has reached polymerization temperature. Step (c) is performed by gravity. Step (d) is performed by first subjecting the heated polymerized material to a fog mist cooling medium for a predetermined period of time, then subjecting the material to both the fog mist and a liquid cooling medium sprayed into the inside of the material and finally subjecting the material to a liquid cooling medium directly sprayed onto the outside of the material.

Having thus described herein above the component parts of the polymerizing system and the control circuit therefor, it becomes evident that the illustrated embodiment of the present invention is capable of carrying out the invention as outlined in the objects above. It is understood that various modifications of design of the component parts and circuitry therefor would be obvious to those skilled in the art, without departing from the spirit of the invention.

I claim:

1. A process of producing a molded article comprising providing a mold having an exterior wall member shaped to form a receptacle having an open top, and an interior wall member located within said receptacle and spaced from said outer wall member to form a mold cavity; placing in said mold cavity a raw plastic material which conforms to the shape of a portion of the cavity, passing said mold through a heating zone and retaining it therein for a sufficient time and at a sufficient temperature to conform said plastic material to the shape of the mold; moving the mold from said heating zone to a first cooling zone; surrounding the mold in said first cooling zone with a cooling fluid; moving the mold from said first cooling zone to a second cooling zone, spraying a cooling fluid primarily on the interior wall of the mold in said second cooling zone, moving the mold from said second cooling zone to a third cooling zone, spraying a cooling fluid primarily on the exterior wall of said mold in said third cooling zone; moving the mold from said third cooling zone; and removing the cooled plastic article from the mold.

2. A process as in claim 1 wherein the cooling fluid in said first cooling zone includes a fog generated by spraying water into air.

3. A process as in claim 2 wherein said three cooling zones are in communication with each other and said fog is drawn through said second cooling zone from said first cooling zone and is then exhausted from said second cooling zone.

4. A process as in claim 2 wherein the cooling fluid used in said second cooling zone consists of water in the form of liquid sprays.

5. A process as in claim 4 wherein the cooling fluid used in said third cooling zone consists of water in the form of liquid sprays.

6. A process as in claim 5 wherein said three cooling zones are formed as a continuous covered passage and a body of water is maintained below and throughout the length of said passage and in open communication with said passage.

7. A process as in claim 6 wherein water is withdrawn from said body of water and is sprayed to form the fog in said first cooling zone and the liquid sprays in the second and third cooling zones, whereby water falling from said cooling zones will be collected and recirculated to said zones.

8. A process of producing a molded article comprising: providing a mold having walls shaped to define a plastic receiving cavity, placing plastic to be shaped into said cavity, moving said mold through an opening into a heating chamber, closing said heating chamber, circulating heated air in a continuous path around said mold at a temperature sufficient to form said plastic into a shaped object conforming to the shape of said cavity, reopening said heating chamber, moving the mold through the opening from said heating chamber, moving said mold along a path into a cooling chamber and directing a cooling liquid in said cooling chamber laterally from opposite sides of the path of travel toward the path of travel of said mold for impinging the liquid simultaneously upon the walls of said mold as said mold is moved along said path and removing said shaped plastic from the cavity of said mold.

9. The process defined in claim 8 including directing a water fog toward said path of travel of said mold for additional cooling of said mold.

10. The process defined in claim 8 wherein said mold includes interior and exterior walls defining said cavity therebetween and wherein the cooling liquid is directed primarily against said exterior walls during a first period of cooling and against the interior walls during a subsequent period of cooling.

11. The process defined in claim 8 including repeating the steps of said process with subsequent molds and successively processing each such mold, as the adjacent mold is also processed.

* * * * *